Patented Feb. 2, 1926.

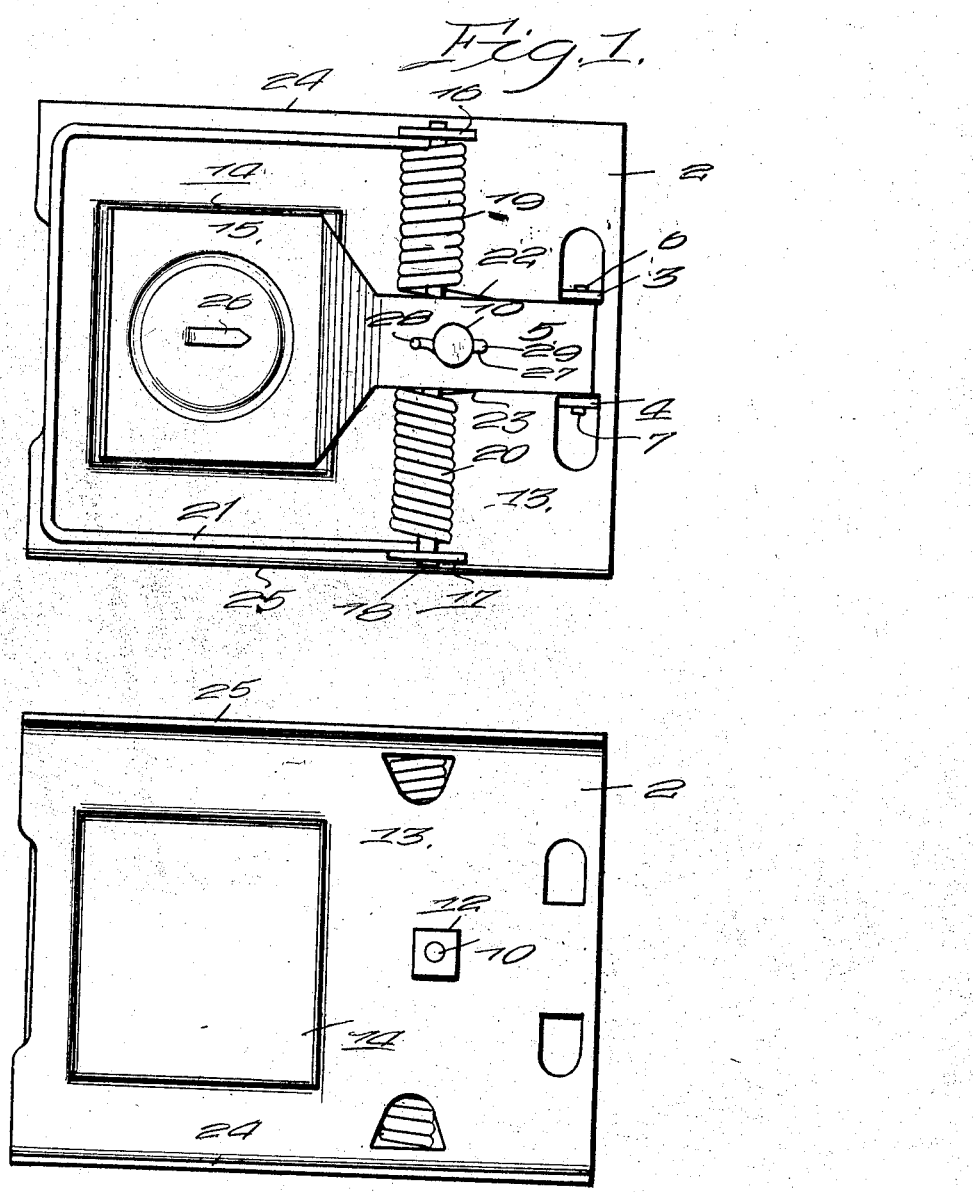

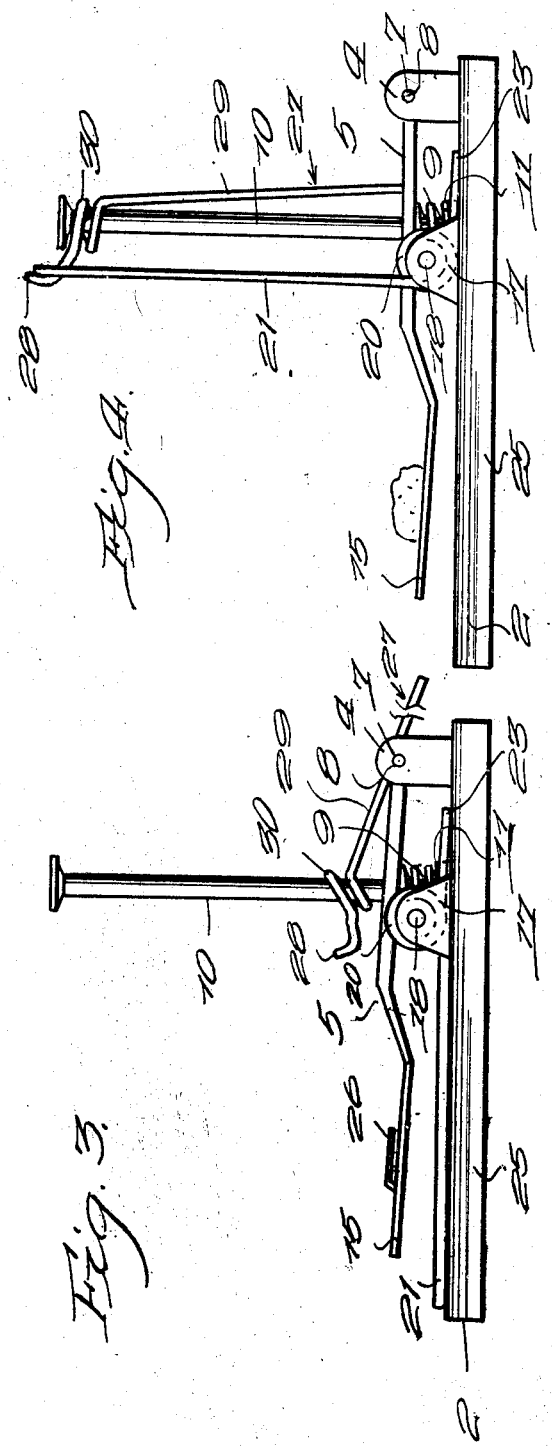
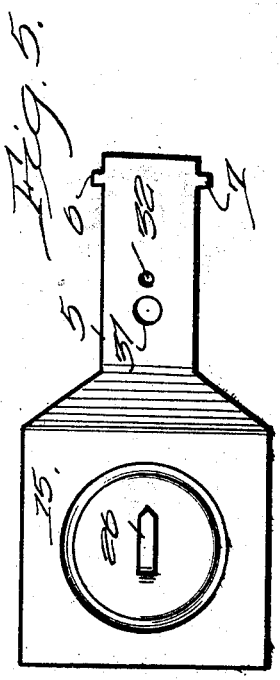

1,571,635

UNITED STATES PATENT OFFICE.

JOE NAIDUL, OF WEST ALLIS, WISCONSIN.

TRAP.

Application filed January 27, 1925. Serial No. 5,114.

*To all whom it may concern:*

Be it known that JOE NAIDUL, a citizen of the United States, residing at West Allis, in the county of Milwaukee and State of Wisconsin, has invented certain new and useful Improvements in Traps, of which the following is a specification.

This invention relates to traps.

An object of this invention is to provide a trap which is easily set, and which may be set with a minimum of danger to an accidental snapping, and yet at the same time the trap may be very powerful.

A further object of this invention is to provide a trap in which the movement of the jaw is relatively a short distance, and from which the possibility of escape is minimized.

A further object of this invention is to provide a trap in which the trip moves entirely away from the jaw, and yet which at the same time is normally, when set, considerably above the lower jaw of the trap.

A further object of this invention is generally to provide a trap of an improved character, of simple construction, which is efficient in operation and which may be manufactured at a minimum cost.

With the foregoing and other objects in view I have invented the device illustrated in the accompanying drawings, in which:

Figure 1 is a top plan view of my improved trap.

Figure 2 is a bottom plan view thereof.

Figure 3 is a side elevation of the trap unset.

Figure 4 is a side elevation of the trap set.

Figure 5 is a top plan view of the trip.

Like reference characters indicate like parts throughout the several views of the drawings and in the specification. The trap is provided with a base 2, from which upstand standards 3 and 4, to which standards 3 and 4 is pivotally mounted a trip 5, the pivotal mounting comprising bent-out stub shafts 6 and 7 from the trip 5, the stub shafts 6 and 7 extending through journaled perforations 8 in the upstanding portions 3 and 4. The trip 5 is yieldingly held upward by a spring 9, the spring 9 encircling a post 10, the post 10 being anchored to the base 2 by an upper nut 11 and a lower nut 12, the nuts 11 and 12 clamping upon the floor 13 of the base member 2. The base member 2 comprises in addition to the floor 13 a recess 14, the recess 14 is adapted to receive the bait carrying end 15 of the trip 5. The base 2 comprises further a pair of upstanding standards 16 and 17, carrying a shaft 18, around which shaft 18 are wound helical ends 19 and 20 of the spring jaw 21, which helical ends have terminals 22 and 23 resting upon the base 2. The base 2 is further provided with depending side walls 24 and 25, which serve as legs for the same. The trip 5 is provided with a bait hook 26. Carried upon the post 10 is a link 27, comprising a hook end 28 and a spring stem 29, the link 27 being helically bent at 30 to embrace the trip 5 the hooked end 28 of the link 27 is adapted to detain the jaw 21. The post 10 is provided with a perforation 31 for receiving the post 10, and is also provided with a depression 32 for normally holding the spring end 29. In order to set the trap the jaw 21 is swung upwardly and its cross bar is detained by the hook 28 of the link 27; the spring end 29 of the link 27 is inserted into the depression 32 of the trip 5 which is resiliently held in this position by the upward tension of the spring 9. An animal lured by the bait placed on the hook 26 of the trip 5 will approach the trap and in its attempt to get the bait will depress the end 15 of the trip 5 against the tension of the spring 9. This will free the spring end 29 of the link 27 from the depression 32 and as the link 27 loosely embraces the post 10, the link will slide down the post 10 and the freed jaw 21 actuated by its helical ends 19 and 20 will move to its horizontal position with a force and strike the animal, killing it.

Claims:

1. In combination in a trap, a base member provided with a cylindrical post mounted at right angles to the base member, a spring jaw carried by the base member, the base member serving as a second jaw, a wire bent around the post and provided with a tripping finger adapted to engage the spring jaw, a bait receiving member pivotally mounted to the base plate and provided with a socket, the other end of said wire adapted to engage the socket.

2. In combination in a trap, a sheet metal base provided with stamped-out upstanding bearing members and flanged downward, a nail mounted at right angles to the base member, a spring jaw carried by one set of bearing members and a bait plate pivotally carried by another set of bearing members, and a wire bent around the nail, bent at one terminal to engage the spring jaw and depending at the other end to engage the bait plate.

3. In combination in a trap, a bait plate comprising a piece of sheet metal provided with a bait hook stamped therefrom and provided intermediate its ends with an opening and a socket adjacent the opening and at one of its ends with stamped-out stub shafts, a base plate provided with bearings for the stub shafts and with a post, the post passing through the opening in the bait plate, a trip carried by the post adapted to engage the socket in the bait plate and a spring jaw carried by the base plate adapted to cooperate with the trip.

In testimony whereof I affix my signature.

JOE NAIDUL.